United States Patent
Akiyama et al.

(10) Patent No.: US 9,667,149 B2
(45) Date of Patent: May 30, 2017

(54) ELECTRIC POWER CONVERTER APPARATUS WHICH ATTENUATES FREQUENCY COMPONENTS OF RIPPLE IN OUTPUT CURRENT

(71) Applicant: DENSO CORPORATION, Kariya, Aichi-pref. (JP)

(72) Inventors: Kiyokazu Akiyama, Okazaki (JP); Shinji Ohoka, Okazaki (JP); Yuuki Takemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 61 days.

(21) Appl. No.: 14/743,596

(22) Filed: Jun. 18, 2015

(65) Prior Publication Data

US 2015/0372598 A1    Dec. 24, 2015

(30) Foreign Application Priority Data

Jun. 18, 2014    (JP) ................................. 2014-125545

(51) Int. Cl.
  *H02M 1/14*    (2006.01)
  *H02M 3/28*    (2006.01)
  *H02M 3/335*    (2006.01)

(52) U.S. Cl.
  CPC ............ *H02M 3/285* (2013.01); *H02M 1/14* (2013.01); *H02M 3/3353* (2013.01); *H02M 3/33569* (2013.01)

(58) Field of Classification Search
  CPC ............ H02M 1/12; H02M 1/14; H02M 1/15; H02M 3/3372; H02M 3/3384; H02M 3/3388; H02M 3/3378
  See application file for complete search history.

(56) References Cited

U.S. PATENT DOCUMENTS

| | | | | |
|---|---|---|---|---|
| 4,779,184 A | * | 10/1988 | White | H02J 1/102 307/82 |
| 2004/0223348 A1 | * | 11/2004 | West | H02M 7/53875 363/39 |
| 2010/0321080 A1 | * | 12/2010 | Chen | H02M 3/1584 327/295 |
| 2012/0319478 A1 | * | 12/2012 | Gentchev | H02M 1/14 307/28 |

(Continued)

FOREIGN PATENT DOCUMENTS

| | | |
|---|---|---|
| JP | 2009-100515 A | 5/2009 |
| JP | 2010-233292 A | 10/2010 |
| JP | 2010-252513 A | 11/2010 |

*Primary Examiner* — Harry Behm
(74) *Attorney, Agent, or Firm* — Oliff PLC

(57) ABSTRACT

An electric power converter apparatus incorporates a plurality of electric power converter circuits having respective output terminals connected in common, with output power being produced from the common output terminals. Each converter circuit uses an identical switching frequency, in executing power conversion based on PWM control of switching by a plurality of switching elements. The switching operations of the respective converter circuits mutually differ in phase, by an amount determined in accordance with the currently applied PWM duty ratio. The phase difference value is predetermined for minimizing the amplitude of specific harmonic frequency components of a ripple current component in the output current from the apparatus.

10 Claims, 10 Drawing Sheets

(56) References Cited

U.S. PATENT DOCUMENTS

2013/0076150 A1* 3/2013 Wagoner ............. H02M 3/1584
307/82
2015/0277460 A1* 10/2015 Liu ........................... H03L 7/06
323/280

* cited by examiner

PHASE DIFFERENCE BETWEEN PWM SIGNALS FROM CONTROL CIRCUITS 14 AND 15 RESPECTIVELY (deg)

PHASE DIFFERENCE BETWEEN PWM SIGNALS FROM CONTROL CIRCUITS 14 AND 15 RESPECTIVELY (deg)

PHASE DIFFERENCE BETWEEN PWM SIGNALS FROM
CONTROL CIRCUITS 14 AND 15 RESPECTIVELY (deg)

PHASE DIFFERENCE BETWEEN PWM SIGNALS FROM
CONTROL CIRCUITS 14 AND 15 RESPECTIVELY (deg)

PHASE DIFFERENCE BETWEEN PWM SIGNALS FROM
CONTROL CIRCUITS 14 AND 15 RESPECTIVELY (deg)

PHASE DIFFERENCE BETWEEN PWM SIGNALS FROM
CONTROL CIRCUITS 14 AND 15 RESPECTIVELY (deg)

ELECTRIC POWER CONVERTER APPARATUS WHICH ATTENUATES FREQUENCY COMPONENTS OF RIPPLE IN OUTPUT CURRENT

CROSS-REFERENCE TO RELATED APPLICATIONS

This application is based on and incorporates herein by reference Japanese Patent First Application No. 2014-125545 filed on Jun. 18, 2014.

BACKGROUND OF THE INVENTION

Field of Application

The present invention relates to an electric power converter apparatus incorporating switching elements, which performs electric power conversion by switching operation of the switching elements.

Description of Related Art

Types of electric power converter apparatus are known, such as an electric power source apparatus disclosed in Japanese patent publication No. 2009-100515 (designated in the following as reference 1), in which switching elements of a plurality of electric power converter circuits are switched to perform electric power conversion, under control of respective control circuits, with respective output currents from the electric power converter circuits being combined to constitute the output current from the apparatus.

The electric power source apparatus of reference 1 incorporates three DC-DC converters and three controllers (control circuits). Each DC-DC converter incorporates switching elements, and executes switching of the switching elements to perform conversion of electric power that is supplied to input terminals, and supplies converted electric power from output terminals. Each controller generates a PWM (pulse width modulation) signal for controlling the switching elements of a corresponding one of the DC-DC converters. The phases of the PWM signals from the three DC-DC converters are evenly dispersed, thereby evenly dispersing the phase of a ripple current (produced as a result of the switching of the switching elements) in the output current from the electric power source apparatus. The objective of this is to reduce the amplitude of the ripple current.

However with that method, although the amplitude of the ripple current can be reduced, there is no reduction in amplitude of ripple current frequency components, i.e., components at frequencies which are harmonics of the ripple current frequency. As a result, substantial electrical noise may be produced by the output current from such an electric power converter apparatus, at frequencies which are sufficiently high to cause interference with radio reception.

SUMMARY OF THE INVENTION

Hence it is desired to overcome the above problem, by enabling a reduction of the amplitude of specific ripple current frequency components contained in the output current from an electric power converter apparatus which executes electric power converter by switching of switching elements.

To achieve this, the invention provides an electric power apparatus having a plurality of electric power converter circuits connected to control circuitry. Respective output terminals of the electric power converter circuits are connected in common, i.e., with an output current from the apparatus being a combination of respective output currents from the electric power converter circuits. Each of the electric power converter circuits incorporates a plurality of switching elements, and is controlled by a corresponding PWM (pulse width modulation) control signal supplied from the control circuitry, for executing switching of the switching elements, to thereby convert input electric power (supplied to the input terminals) to output electric power that is supplied from the output terminals.

Specifically, the control circuitry generates a plurality of PWM signals of identical frequency, mutually differing in phase by a set value of phase difference, and supplies each PWM signal to a corresponding one of the electric power converter circuits, for controlling switching of the corresponding switching elements. The set value of phase difference is determined such as to minimize the amplitude of specific ripple current frequency components contained in the output current from the electric power converter apparatus, i.e., frequency components that are within a specific frequency range.

According to embodiments described in the following, each of the plurality of PWM signals is modulated by an identical set value of duty ratio, and the control circuit includes a data map and a phase difference setting section. The data map consists of stored data which relate each of respective values of the PWM duty ratio to a corresponding value of phase difference. Each value of phase difference is predetermined such that when it is selected (to be the set value of phase difference), and the corresponding duty ratio is the set value of duty ratio, the amplitude of the specific ripple current frequency components is minimized. To achieve this, the phase difference setting section obtains (from the data map) the phase difference value corresponding to the PWM duty ratio that is currently set. That value of phase difference is then set as the specific phase difference between the plurality of PWM signals.

In that way as the duty ratio of the plurality of PWM signals becomes changed, the phase difference between them becomes changed accordingly, such as to minimize the amplitude of the ripple current frequency components. High-frequency electrical noise resulting from these ripple current frequency components in the output current from the electric power converter apparatus, in particular, electrical noise which may cause interference with reception by a radio receiver, can thereby be effectively reduced.

The set value of duty ratio may be determined, for example, in accordance with a command value of output voltage from the electric power converter apparatus.

The data to be stored as the contents of the data map (i.e., phase difference values corresponding to respective values of duty ratio) may be advantageously derived based on results from computer simulation, rather than by executing extensive testing and measurement operations to obtain the required information. In that way the necessary contents of the data map can be readily established.

From another aspect, the control section may comprise a plurality of data maps (corresponding to respectively different specific frequency ranges) each of the form described above. In that case, the control section further includes a frequency component analyzer section (whose analysis results express the respective amplitudes of the ripple current frequency components within each of the specific frequency ranges) and a frequency component designation section. The phase difference values held in each data map are predetermined for minimizing the amplitude of the ripple current frequency components that are within the frequency range that corresponds to that particular data map. The frequency component designation section serves to specify a high-amplitude one of the ripple current frequency components as being a designated frequency component. The data map whose corresponding frequency range contains the frequency of the designated frequency component is selected for use, i.e., for setting a PWM phase difference value that corresponds to the currently set value of duty ratio.

Preferably, a target value of frequency component amplitude is predetermined and stored in a memory device. When the amplitude of any of the ripple current frequency components within any of the specific frequency ranges is judged (based on the frequency analysis results) to exceed the target value, the frequency component whose amplitude exceeds the target value by the greatest amount is specified as being the designated frequency component, and the data map corresponding to the frequency range containing the designated frequency component is then selected for use.

In that way, the amplitude of the ripple current frequency components can be achieved effectively, by selecting the most appropriate data map in accordance with the respective frequencies and amplitudes of the ripple current frequency components that are presently contained in the output current from the electric power converter apparatus.

The control circuit may include both a frequency component analyzer section and also a data map correction section. The data map correction section serves to correct the respective phase difference values held in a data map, based on the analysis results from the frequency component analyzer section. For example, when a duty ratio has become set for the PWM signals, processing may be executed by the data map correction section for replacing the corresponding phase difference value (the value currently held in the data map) by a corrected phase difference value, which will more effectively reduce the amplitude of the ripple current frequency components.

The invention is particularly applicable to an electric power converter apparatus for installation in a motor vehicle, since the invention enables a reduction of interference with reception by a radio receiver of the vehicle, when the interference is caused by electrical noise produced by operation of the electric power converter apparatus.

In the following description of embodiments and in the appended claims, "minimizing an amplitude of ripple current frequency components" is to be understood as reducing the amplitude of the ripple current frequency components as far as possible under the condition in which an electric power converter apparatus is currently operating.

DESCRIPTION OF PREFERRED EMBODIMENTS

Figure 1:
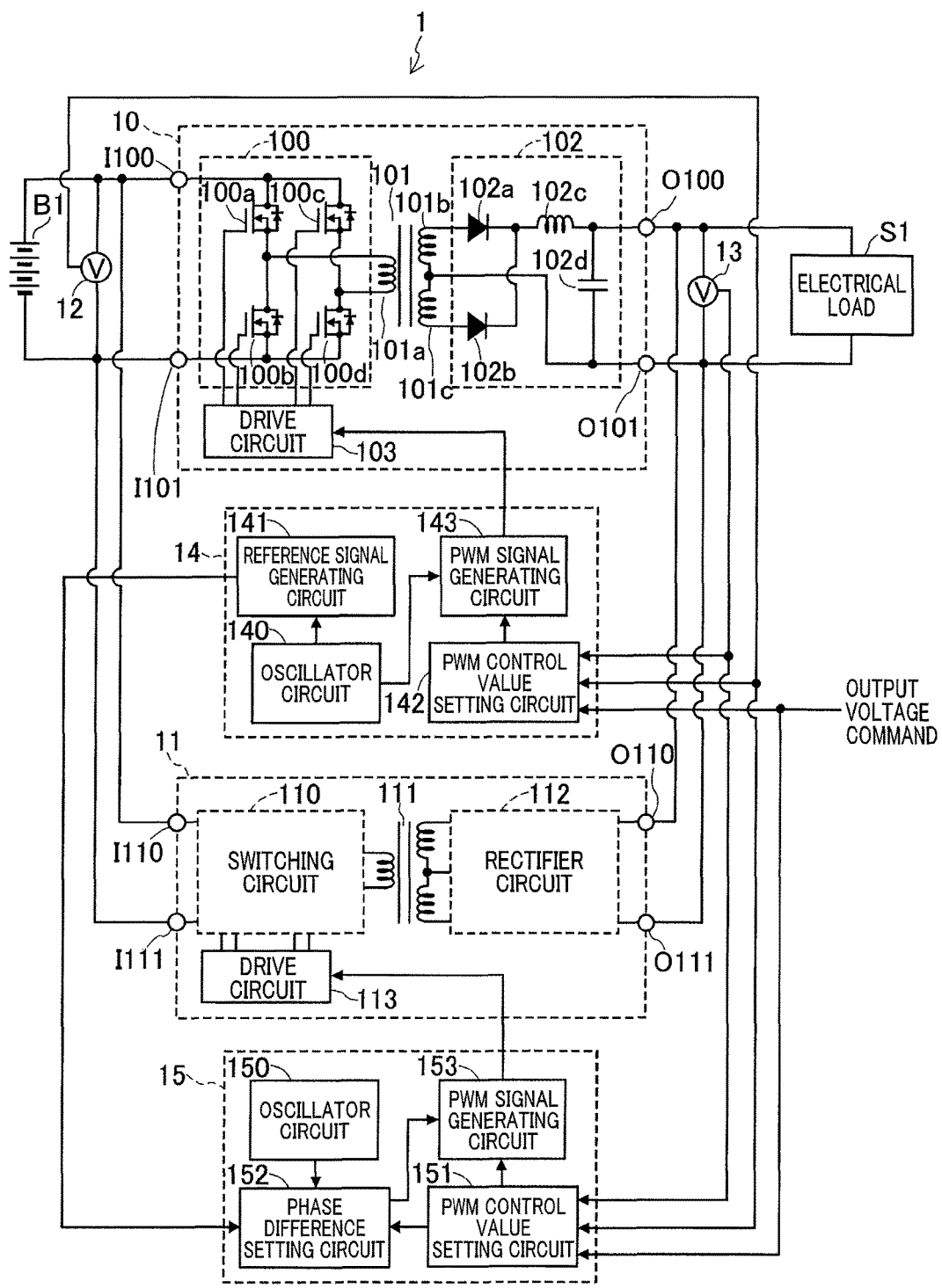
FIG. 1 is a circuit diagram of a first embodiment of an electric power converter apparatus.

Embodiments of an electric power converter apparatus are described in the following, each being a DC-to-DC converter for installation in a motor vehicle, for converting DC power supplied from a high-voltage battery to DC power at a controlled voltage, which is supplied to an electrical load of the vehicle.

First Embodiment

A first embodiment will be described referring to FIG. 1. As shown, an electric power converter apparatus 1 of this embodiment receives DC power from a high-voltage battery B1 of a vehicle, and converts this to output DC power which is supplied to an electrical load S1 of the vehicle. The electric power converter apparatus 1 includes two electric power converter circuits 10 and 11, voltage sensors 12 and 13, and two control circuits 13 and 14.

The electric power converter circuit 10 converts the input DC power, supplied from the high-voltage battery B1, to output DC power that is supplied to the electrical load S1, at a different voltage from that of the input DC power, with the output DC power electrically insulated from the input DC power. As shown, the electric power converter circuit 10 includes a switching circuit 100, a transformer 101, a rectifier circuit 102 and a drive circuit 103.

The switching circuit 100 converts the DC power from the high-voltage battery B1 to AC power by switching operation of a set of FETs 100a to 100d, functioning as respective switching elements.

The FETs 100a, 100b are connected in series, as are the FETs 100c, 100d, with the source electrodes of the FETs 100a, 100c respectively connected to the drain electrodes of the FETs 100b, 100d. The drain electrodes of the FETs 100a, 100b are connected in common to an input terminal I100 of the electric power converter circuit 10 (and thereby connected to the positive terminal of the high-voltage battery B1), while the source electrodes of the FETs 100a, 100b are connected in common to an input terminal I101 of the electric is power converter circuit 10 (and thereby connected the negative terminal of the high-voltage battery B1). The junction point of the FETs 100a, 100b and the junction point of the FETs 100c, 100d are connected to opposite ends of a primary winding 101a of a transformer 101. The gate electrodes of the FETs 100a, 100b, 100c, 100d are respectively connected to receive drive signals (switching control signals) from a drive circuit 103.

The transformer 101 converts AC power supplied to its primary winding 101a to AC power at a different voltage, produced from secondary windings 101b, 101c of the transformer 101, which are connected to a rectifier circuit 102.

The rectifier circuit 102 includes diodes 102a, 102b, an inductor 102c, and a capacitor 102d, and rectifies the AC power supplied from the secondary windings 101b, 101c to obtain DC power that is supplied to the electrical load S1. The diodes 102a, 102b rectify the AC power supplied from the secondary windings 101b, 101c, with the anodes of the diodes 102a and 102b being respectively connected to opposite ends of the secondary windings 101b, 101c, and the cathodes of the 102a and 102a being connected in common to one end of the inductor 102c. The junction point of the secondary windings 101b, 101c is connected to one side of the capacitor 102d and to the terminal O101 (the negative output terminal of the electric power converter circuit 10) while the other side of the capacitor 102d is connected to the other end of the inductor 102c and to the terminal O100 (the positive output terminal of the electric power converter circuit 10). The electrical load S1 is connected between the output terminals 0100 and 0101.

The drive circuit 103 receives a PWM signal (described hereinafter) from a control circuit 14, and drives the FETs 100a, 100b, 100c, 100d based on that PWM signal. Specifically, drive signals (switching control signals) outputted from the drive circuit 103 are respectively applied to the gate electrodes of the FETs 100a, 100b, 100c, 100d.

The electric power converter circuit 11 converts the input DC power, supplied from the high-voltage battery B1, to output DC power that is supplied to the electrical load S1, at a different voltage from that of the input DC power, with the output DC power being electrically insulated from the input DC power. As shown, the electric power converter circuit 11 includes a switching circuit 110, a rectifier circuit 112, and a drive circuit 113, which have respectively identical circuit configurations to those of the switching circuit 100, the rectifier circuit 102 and the drive circuit 103 of the electric power converter circuit 10. Input terminals I110 and I111 of the electric power converter circuit 11 are respectively connected to the input terminal I100 and I101 of the electric power converter circuit 10, and hence to the high-voltage battery B1. Output terminals O110 and O111 of the electric power converter circuit 11 are respectively connected to the output terminals O100 and O101 of the electric power converter circuit 10, and hence are connected across the electrical load S1.

A voltage sensor 12 is connected between the input terminals I100, I101 of the electric power converter circuit 10 and between the input terminals I110, I111 of the electric power converter circuit 11, to detect the input voltage of the electric power converter circuit 10 and electric power converter circuit 11, and inputs the detection results to the control circuit 14 and the control circuit 15. A voltage sensor 13 is connected between the output terminals O100, O101 of the electric power converter circuit 10 and between the output terminals O110, O111 of the electric power converter circuit 11, to detect the output voltage of the electric power converter circuit 10 and electric power converter circuit 11, and inputs the detection results to the control circuit 14 and the control circuit 15.

The control circuit 14 controls the electric power converter circuit 10 based on an (externally supplied) output voltage command signal which expresses a required value of output DC voltage from the electric power converter apparatus 1, and on detected values of input voltage and output voltage of the electric power converter circuits 10 and 11 from the voltage sensors 12 and 13. The control circuit 14 generates the PWM signal which controls the switching of the FETs 100a-100d. With this embodiment, the frequency of the PWM signal from the control circuit 14 is used as a reference PWM signal frequency for controlling the electric power converter circuit 11. As shown, the control circuit 14 includes an oscillator circuit 140, a reference signal generating circuit 141, a PWM control value setting circuit 142 and a PWM signal generating circuit 143.

The oscillator circuit 140 generates a pulse signal at the PWM signal reference frequency (with this embodiment, 100 kHz), which is supplied to the reference signal generating circuit 141 and the PWM signal generating circuit 143. The term "pulse signal" is used herein to signify a signal consisting of a series of fixed-duration pulses.

The reference signal generating circuit 141 produces a reference signal which is synchronized with the pulse signal from the oscillator circuit 140, and which is inputted to the control circuit 15.

The PWM control value setting circuit 142 sets a control value of duty ratio for the PWM signal switching operation of the switching circuit 100, and outputs the control value to the PWM signal generating circuit 143. The PWM signal generating circuit 143 thereby generates a PWM signal at 100 kHz, modulated by the control value of duty ratio. The control value of PWM duty ratio is determined based on the externally supplied voltage command signal and on the voltage values detected by the voltage sensors 12 and 13. With this embodiment, the reference signal from the reference signal generating circuit 141 is identical in frequency to the PWM signal.

The PWM signal generating circuit 143 thus generates the PWM signal based on the pulse signal received from the oscillator circuit 140 and on the control value of duty ratio received from the PWM control value setting circuit 142. Specifically, the PWM signal has the frequency (100 kHz) of the pulse signal from the oscillator circuit 140.

The control circuit 15 produces a PWM signal for controlling switching of FETs (not shown in the drawings) in the switching circuit 110 of the electric power converter circuit 11, with the PWM signal being generated based upon the output voltage command signal, the detected voltage values from the voltage sensors 11 and 13, and the reference signal supplied from the reference signal generating circuit 141 of the control circuit 14. The control circuit 15 incorporates an oscillator circuit 150, a PWM control value setting circuit 151, a phase difference setting circuit 152 and a PWM signal generating circuit 153.

The oscillator circuit 150 generates a pulse signal which is controlled to maintain the same frequency as the pulse signal generated by the oscillator circuit 140 of the control circuit 14, but which is not synchronized with (i.e., is not locked to the same phase as) the signal from the oscillator circuit 140. The pulse signal from the oscillator circuit 150 is inputted to the phase difference setting circuit 152.

The PWM control value setting circuit 151 sets a control value of PWM duty ratio, which in principle is identical to the value of duty ratio that is set by the PWM control value setting circuit 142 as described above, i.e., being determined similarly based on the output voltage command signal and on the voltage detection results from the voltage sensors 12 and 13. That control value is inputted to the PWM signal generating circuit 153 from the PWM control value setting circuit 151, for determining the duty ratio of a PWM signal that is generated by the PWM signal generating circuit 153 and supplied to the drive circuit 113 of the electric power converter circuit 11.

The phase difference setting circuit 152 determines a phase difference value which is a required phase difference between the PWM signals respectively produced from the control circuits 14 and 15. Specifically, the phase difference setting circuit 152 inputs a pulse signal to the PWM signal generating circuit 153 which is identical in frequency to the pulse signal generated by the oscillator circuit 140 (i.e., with this embodiment, nominally 100 kHz) and which differs in phase from the pulse signal generated by the oscillator circuit 140 by the required phase difference. The required PWM phase difference is determined based upon the reference signal which is inputted from the reference signal generating circuit 141 of the control circuit 14, the pulse signal which is inputted from the oscillator circuit 150, and on the duty ratio value that is currently set by the PWM control value setting circuit 151.

Figure 2:
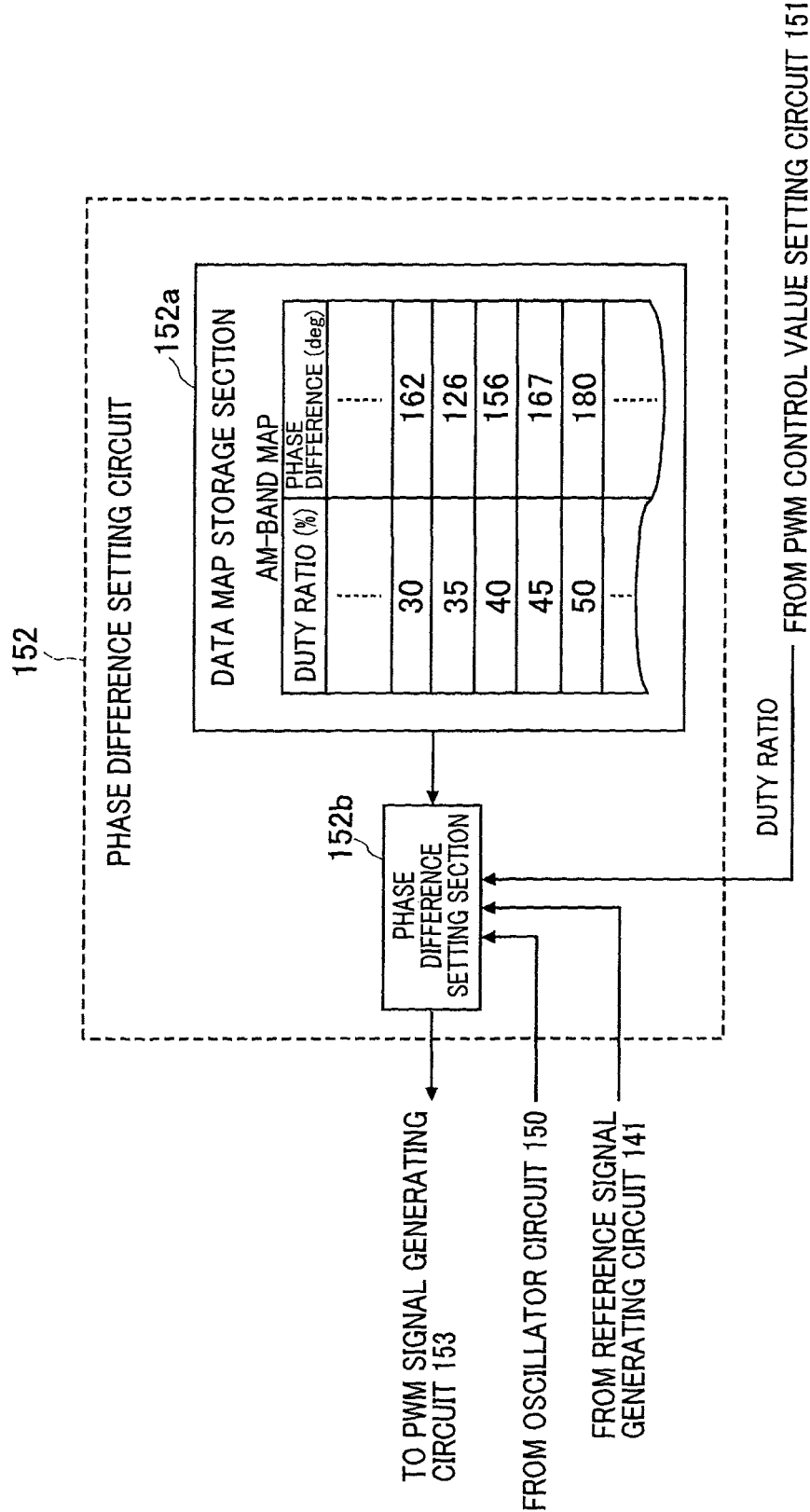
FIG. 2 is a block diagram of a phase difference setting circuit shown in FIG. 1.

The configuration of the phase difference setting circuit 152 is shown in the block diagram of FIG. 2. As shown, the phase difference setting circuit 152 incorporates a data map storage section 152a and a phase difference setting section 152b. A data map held in the data map storage section 152a consists of stored data which express, for each of a plurality of PWM duty ratio values, a corresponding value of phase difference. The corresponding phase difference value is the phase difference that is required to be set (between the PWM signals from the control circuits 14 and 15 respectively) when the corresponding duty ratio value is set.

Each of the phase difference values in the data map is predetermined such that as to minimize the amplitude of specific ripple current frequency components (described in the following) when the switching circuits 100 and 110 execute switching operation using the duty ratio corresponding to that phase difference value.

As described above, the PWM signal generating circuit 143 generates a 100 kHz PWM signal for switching the FETs 100a-100d of the switching circuit 100 at 100 kHz, while the PWM signal generating circuit 153 generates a 100 kHz PWM signal differing in phase from the output signal of the PWM signal generating circuit 143 by a specific amount, i.e., by the phase difference value that is currently set by the phase difference setting circuit 152. Hence the FETs of the switching circuit 110 are switched at 100 kHz, with the set value of phase difference between the switching timings of these FETs and those of the switching circuit 100. Since the switching frequency is 100 kHz and full-wave rectification is applied in the rectifier circuit 102, the output current from the electric power converter apparatus 1 (combination of respective output currents from the electric power converter circuit 10 and the electric power converter circuit 11) contains a 200 kHz ripple current component and also high-frequency components (referred to in the following as ripple current frequency components) having frequencies that are respective harmonics of 200 kHz The phase difference values in the data map of the data map storage section 152a are predetermined for minimizing the amplitude of ripple current frequency components that are within an AM-band radio frequency range. The AM-band frequency range of a radio receiver installed in a vehicle is typically 500 kHz~1.7 MHz. Hence, the $3^{rd}$-order to $8^{th}$-order harmonics of 200 kHz (600 kHz, 800 kHz, 1 MHz, 1.2 MHz, 1.4 MHz, 1.6 MHz) are each within that AM-band frequency range.

Figure 3:
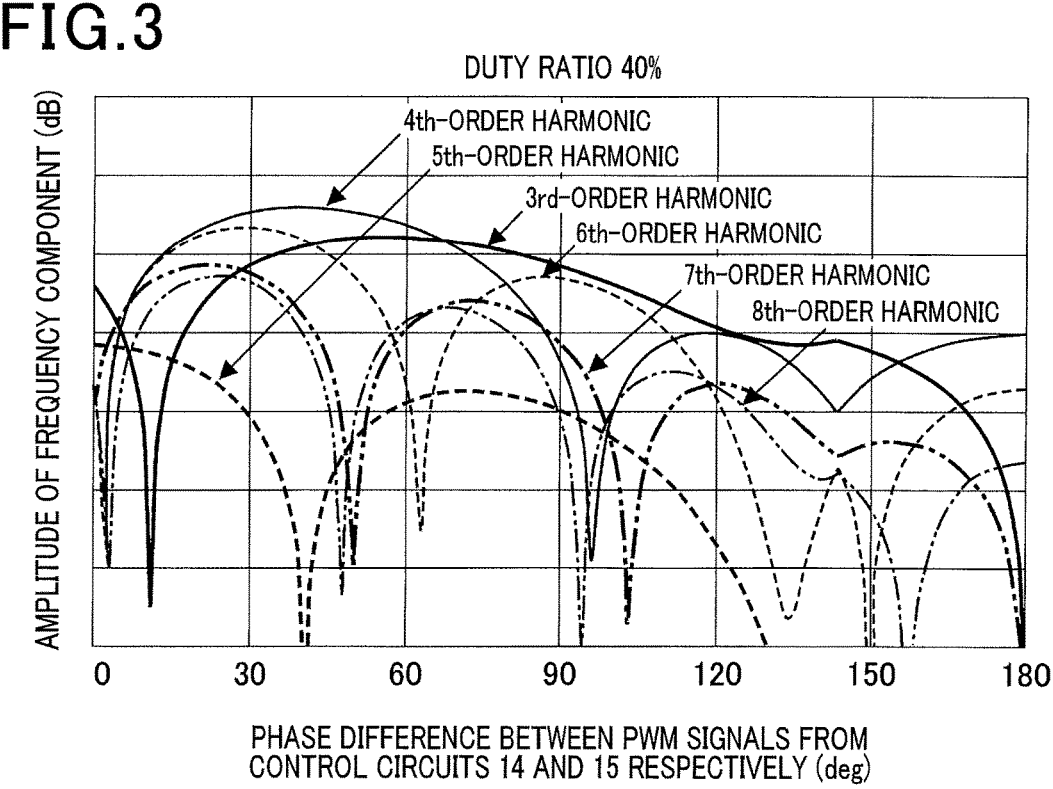
FIG. 3 is a graph showing the relationship of a phase difference between two PWM signals to the amplitudes of ripple current frequency components contained in the output current from the converter apparatus of FIG. 1, when the duty ratio of the PWM signals is 40%.

FIG. 3 shows graphs of the results of computer simulation (for the case of a PWM duty ratio of 40% being specified by the PWM control value setting circuit 151) which relate the phase difference between the 100 kHz signals produced from the control circuits 14 and 15 and respective amplitudes of high-frequency components of the ripple current, specifically the $3^{rd}$-order to $8^{th}$-order harmonics of 200 kHz. The results are shown for values of phase difference within the range 0°~180°.

The term "amplitude of the ripple current frequency components" is used herein to refer to the amplitude of the highest-amplitude one of a plurality of ripple current frequency components.

Figure 4:
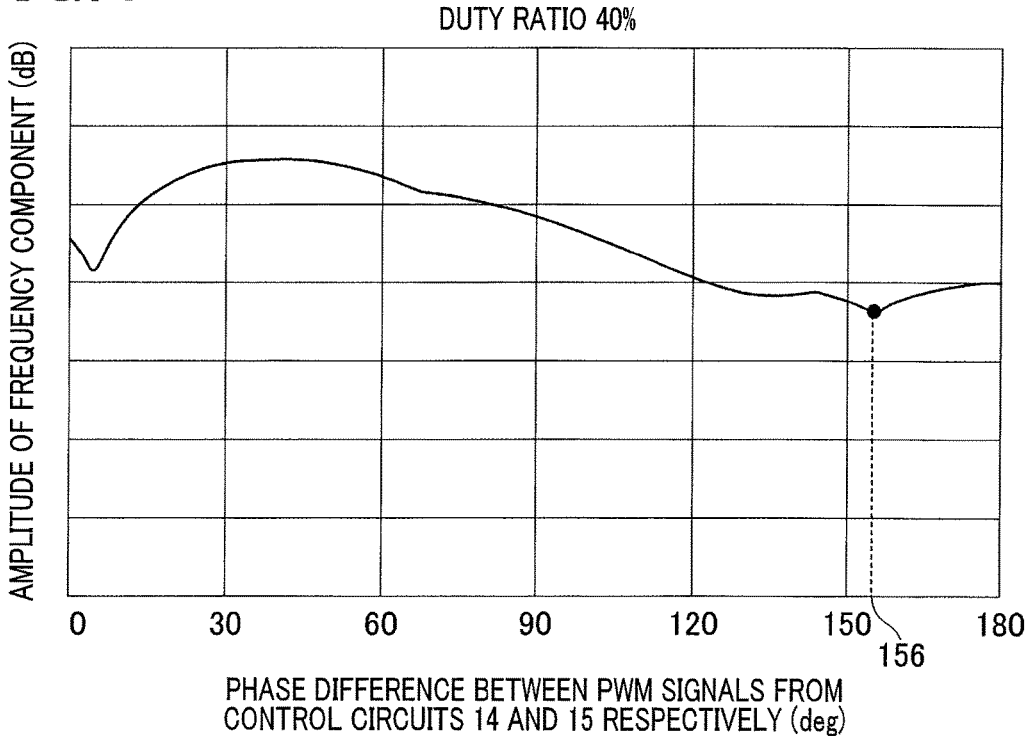
FIG. 4 is a graph showing the relationship between the phase difference of the PWM signals and the maximum amplitude of the ripple current frequency components, when the duty ratio of the PWM signals is 40%.

FIG. 4, corresponding to FIG. 3, shows the relationship between the phase difference values and the amplitude of the ripple current frequency components (as defined above), when the PWM duty ratio is 40%. As illustrated, the minimum amplitude is reached when the phase difference is 156°.

Figure 5:
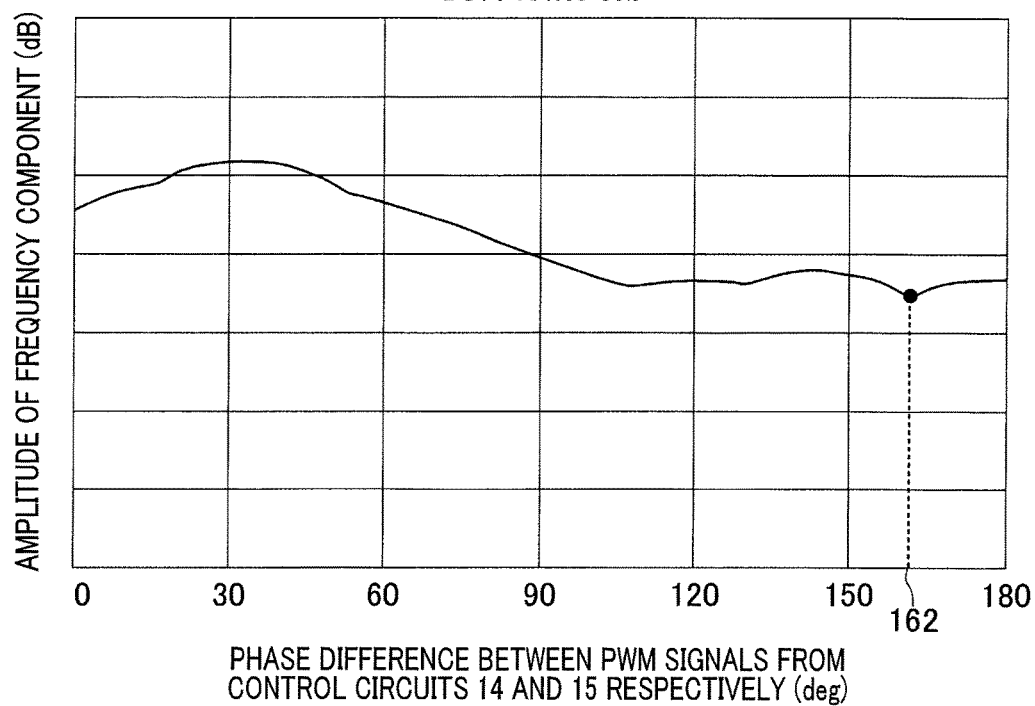
FIG. 5 is a graph showing the relationship between the phase difference of the PWM signals and the maximum amplitude of the ripple current frequency components, when the duty ratio of the PWM signals is 30%.
Figure 6:
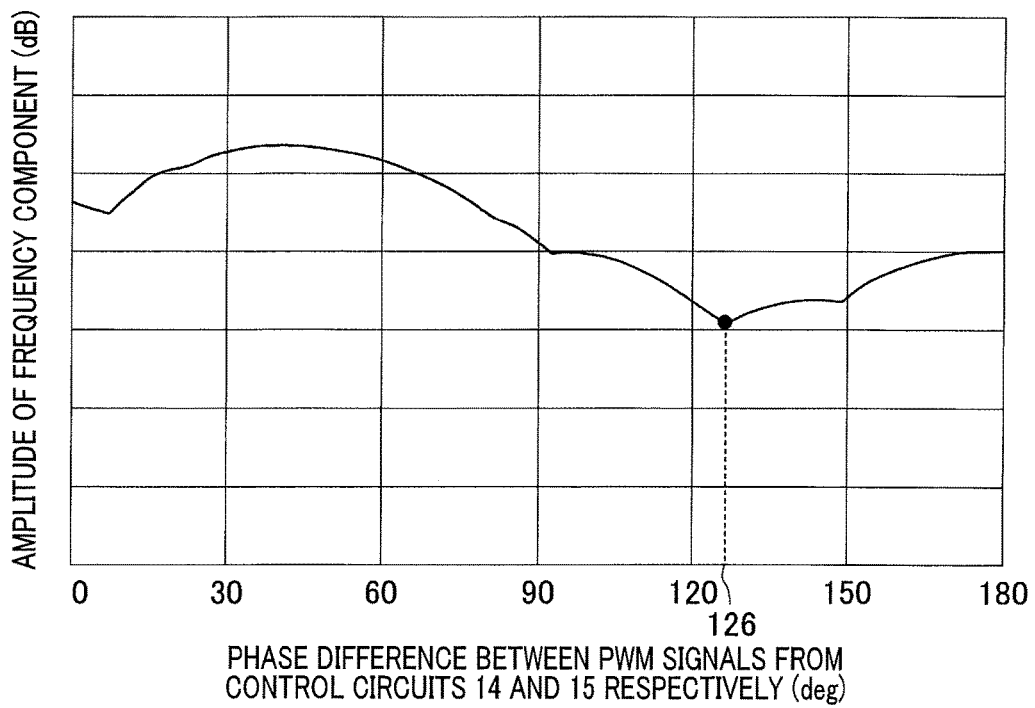
FIG. 6 is a graph showing the relationship between the phase difference of the PWM signals and the maximum amplitude of the ripple current frequency components, when the duty ratio of the PWM signals is 35%.
Figure 7:
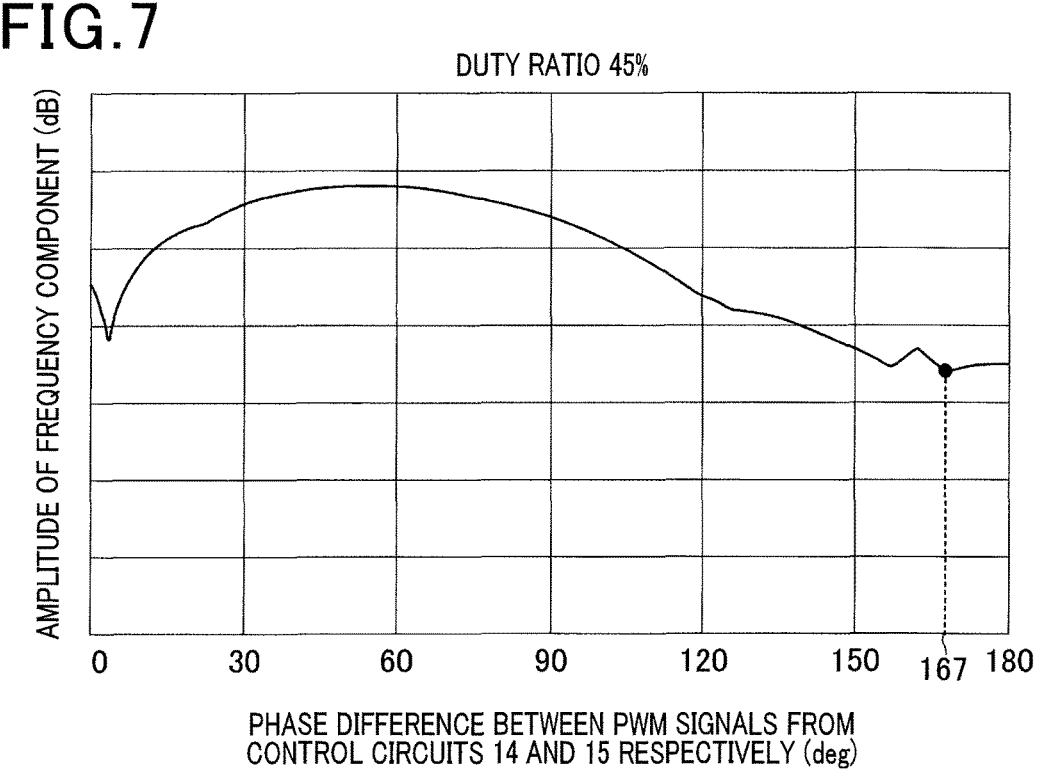
FIG. 7 is a graph showing the relationship between the phase difference of the PWM signals and the maximum amplitude of the ripple current frequency components, when the duty ratio of the PWM signals is 45%.
Figure 8:
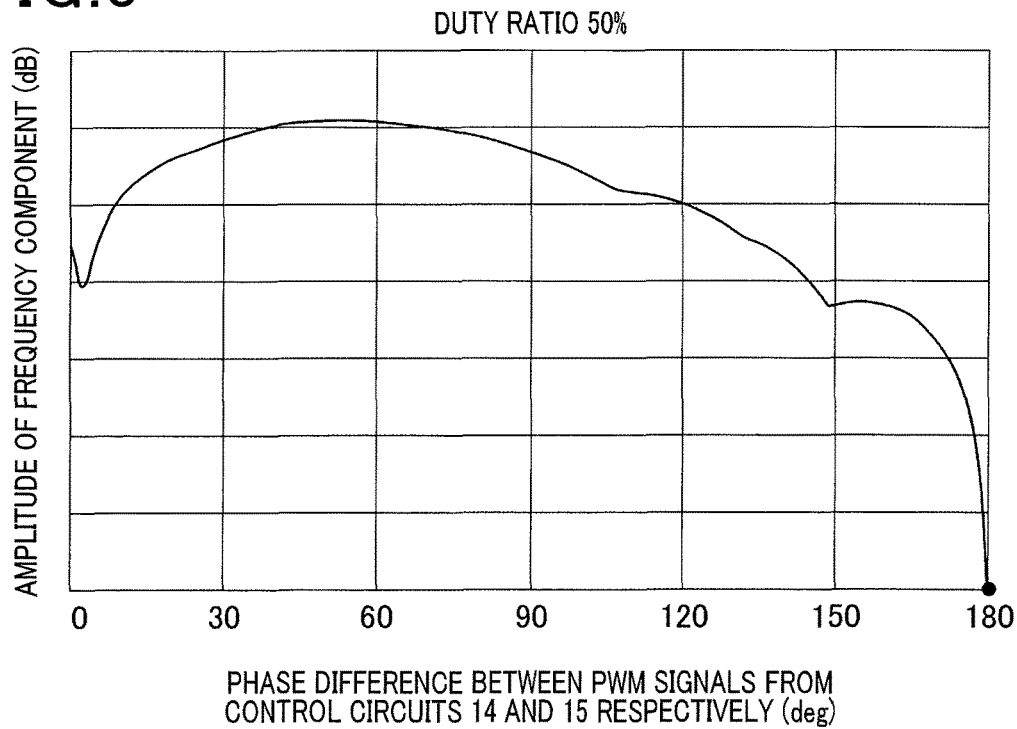
FIG. 8 is a graph showing the relationship between the phase difference of the PWM signals and the maximum amplitude of the ripple current frequency components, when the duty ratio of the PWM signals is 50%.

Similarly as shown in FIG. 5, when the PWM duty ratio is 30%, the amplitude of the ripple current frequency components reaches a lowest value when the phase difference is 162°. As shown in FIG. 6, when the PWM duty ratio is 35%, the lowest value of the amplitude of the ripple current frequency components occurs when the phase difference is 126°. As shown in FIG. 7, when the PWM duty ratio is 45%, the lowest value of the amplitude of the ripple current frequency components occurs when the phase difference is 167°. As shown in FIG. 8, when the PWM duty ratio is 50%, the lowest value of the amplitude of the ripple current frequency components occurs when the phase difference is 180°.

The data map held in the data map storage section 152a expresses the above information, obtained from computer simulation results. That is, the map data express (for each of respective PWM duty ratios 30%, 35%, 45%, 50%, etc.,) the value of phase difference that is required to be set between the PWM signals produced from the control circuits 14 and 15, for minimizing the amplitude of the ripple current frequency components that have frequencies within the AM-band frequency range, when the corresponding duty ratio is applied.

The phase difference setting section 152b is a circuit block which accesses the map data held in the data map storage section 152a and also receives, from the PWM control value setting circuit 151, the value of duty ratio that is currently required to be set, receives the reference signal from the reference signal generating circuit 141, and receives the 100 kHz pulse signal produced from the oscillator circuit 150. Based on these, the phase difference setting section 152b generates a pulse signal which differs in phase from the output signal from the oscillator circuit 140 of the control circuit 14 by the set value of phase difference and is of identical frequency to the output signal from the oscillator circuit 140, and which is inputted to the PWM signal generating circuit 153. The phase difference which is set by the phase difference setting section 152b is the value, held in the map data of the data map storage section 152a, which corresponds to the value of duty ratio that is currently set by the PWM control value setting circuit 151.

Based on the currently set value of duty ratio, and on the pulse signal received from the phase difference setting circuit 152, the PWM signal generating circuit 153 generates the PWM signal which controls switching operation of the switching circuit 110 of the electric power converter circuit 11. The PWM signal is outputted from the PWM signal generating circuit 153 to the drive circuit 113 of the electric power converter circuit 11. In principle, the PWM signal generated by the PWM signal generating circuit 153 has an identical duty ratio to that generated by the PWM signal generating circuit 143.

The operation of the first embodiment will be described referring to FIGS. 1 and 2. When operation of the electric power converter apparatus 1 has started, the oscillator circuit 140 commences generating the 100 kHz pulse signal used as a reference for PWM signal generation, with that pulse signal being outputted to the reference signal generating circuit 141 and the PWM signal generating circuit 143. The reference signal generating circuit 141 generates a reference signal which is synchronized with the pulse signal from the oscillator circuit 140, and which is supplied to the phase difference setting circuit 152 of the control circuit 15.

The PWM control value setting circuit 142 sets a required value of PWM duty ratio, based upon the externally supplied voltage command signal, and upon values of input (battery) voltage and output supply voltage of the electric power converter circuit 10, respectively detected by the voltage sensor 12 and the voltage sensor 13, and inputs that duty ratio value to the PWM signal generating circuit 143. Based on the pulse signal from the oscillator circuit 140 and the duty ratio value that is set by the PWM control value setting circuit 142, the PWM signal generating circuit 143 generates the 100 kHz PWM signal which is outputted to the drive circuit 103 of the electric power converter circuit 10.

The drive circuit 103 drives the FETs 100a-100d in accordance with the PWM signal received from the PWM signal generating circuit 143, with the FETs 100a-100d thereby executing synchronized switching at 100 kHz. Specifically, the FETs 100a and 100c execute complementary switching with the FETs 100b and 100d respectively. The DC power from the high-voltage battery B1 is thereby converted to AC power which is supplied to the primary winding 101a of the transformer 101. AC power at a different voltage is outputted from the secondary windings 101b, 101c of the transformer 101, electrically isolated from the primary side power. The output AC power from the transformer 101 is rectified to DC power by the diodes 102a, 102b, which is smoothed by the inductor 102c and capacitor 102d, and supplied to the electrical load S1.

The PWM control value setting circuit 151 sets a duty ratio value in the same manner (and based on the same input signals) as described for the PWM control value setting circuit 142, i.e., sets the same duty ratio value as the PWM control value setting circuit 142, in principle. The set value of duty ratio is supplied from the PWM control value setting circuit 151 to the phase difference setting circuit 152 and the PWM signal generating circuit 153.

The phase difference setting section 152b of the phase difference setting circuit 152 obtains a required value of phase difference, from the data map of the data map storage section 152a, corresponding to the duty ratio value that is currently set by the PWM control value setting circuit 151. Based on that phase difference value, the reference signal from the reference signal generating circuit 141, the pulse signal from the oscillator circuit 150 and the control value of duty ratio received from the PWM control value setting circuit 151, the phase difference setting section 152b generates a pulse signal which differs in phase from the PWM signal generated by the PWM signal generating circuit 143 by the set value of phase difference and which is of identical frequency to the PWM signal from the PWM signal generating circuit 143. The pulse signal generated by the phase difference setting section 152b is inputted to the PWM signal generating circuit 153.

As described above referring to FIGS. 3 and 4, the value of phase difference that is obtained by the phase difference setting circuit 152 from the data map of the data map storage section 152a is a value whereby the amplitude of high-frequency ripple components in the output current supplied from the electric power converter apparatus 1 (at frequencies within the AM-band radio reception range) is minimized.

In the same way as for the FETs of the switching circuit 100, the FETs of the switching circuit 110 execute switching that is controlled by drive signals from the drive circuit 113, synchronized with the 100 kHz PWM signal from the PWM signal generating circuit 153 that is inputted to the drive circuit 113. The electric power converter circuit 11 thereby converts the DC power supplied from the high-voltage battery B1 to AC power that is supplied to the electrical load S1, in the same manner as described for the electric power converter circuit 10, i.e., with the transformer 111 and the rectifier circuit 112 of the electric power converter circuit 11 functioning as described hereinabove for the transformer 101 and the rectifier circuit 102 of the electric power converter circuit 10 respectively.

In principle the electric power converter circuits 10 and 11 respectively produce the same value of output voltage, which is applied to the electrical load S1 as the output voltage from the output voltage from the electric power converter apparatus 1. The combination of respective output currents from the electric power converter circuit 10 and the electric power converter circuit 11 constitute the output current of the electric power converter apparatus 1, supplied to the electrical load S1. The DC power from the electrical load S1 is thereby converted by the electric power converter apparatus 1 to output DC power at a voltage determined by the output voltage command signal, with the output power being electrically insulated from the input power.

The effects obtained with the first embodiment are as follows.

The electric power converter apparatus 1 incorporates two electric power converter circuits 10 and 11, and two control circuits 14 and 15. The electric power converter circuits 10 and 11 each incorporate FETs as switching elements, and execute switching in accordance with PWM signals produced by the control circuits 14 and 15 respectively. An input DC voltage, applied to the pairs of input terminals I100, I101 and I100, I101 of the electric power converter circuit 10 and electric power converter circuit 11 respectively, is converted to an output DC voltage which appears on the pairs of output terminals O100, O101 and O110, O111 of the electric power converter circuit 10 and electric power converter circuit 11 respectively.

With such an electric power converter apparatus utilizing a plurality of electric power converter circuits in combination, it is possible to disperse the respective phases of the PWM signals which control switching in the various electric power converter circuits, as described in reference document 1 above. That method enables a decrease in the amplitude of a ripple current in the output current from the apparatus, having a frequency determined by the switching frequency of the electric power converter circuits, i.e., 200 kHz in the case of the above embodiment. However the amplitude of high-frequency components in the output current from the apparatus, at harmonic frequencies of the ripple current, is not reduced. Hence such a phase dispersion technique cannot reduce the level of electrical noise produced by the electric power converter apparatus, at frequencies which are sufficiently high as to cause interference in AM radio reception.

However with the first embodiment described above, a phase difference between the PWM signals which control switching in the electric power converter circuits 10 and 11 respectively is controlled such as to effectively reduce the amplitude of specific frequency components of the ripple current in the output current from the electric power converter apparatus 1. This is achieved by appropriately determining the phase difference in accordance with the duty ratio that is currently set for the PWM signals. The electrical noise resulting from these frequency components can thereby be reduced.

With the first embodiment, the control circuit 15 includes the phase difference setting circuit 152 and the PWM signal generating circuit 153, with the phase difference setting circuit 152 being formed of the data map storage section 152a and phase difference setting section 152b. The data map storage section 152a stores memory map data which relates values of PWM signal duty ratio to corresponding values of phase difference. As described above, the phase difference between the respective PWM signals produced from the PWM signal generating circuit 143 and PWM signal generating circuit 153 is set by the phase difference setting circuit 152, using the stored memory map data, at a value in accordance with the PWM duty ratio that is currently being applied. The phase relationship between the PWM signals produced from the PWM signal generating circuit 143 and PWM signal generating circuit 153 can thereby be reliably determined such as to appropriately reduce the amplitude of the ripple current frequency components which are within a specific AM radio reception band.

With the first embodiment, the memory map data are derived with respect to a specific AM radio reception band by employing computer simulation. This enables the map data to be more readily generated than if the memory map data were to be based on results from actual measurements.

With the first embodiment, when the electric power converter apparatuses 10 and 11 and the control circuits 14 and 15 are installed in a motor vehicle, i.e., when the electric power converter apparatus 1 is used in a vehicle in which an AM radio receiver is installed, interference due to electrical noise in the AM frequency band can be effectively reduced.

With the above embodiment, the PWM signal frequency is 100 kHz, however the invention is not limited to any specific frequency.

The first embodiment utilizes two electric power converter apparatuses 10 and 11 and two corresponding control circuits 14 and 15. However it would be equally possible for the electric power converter apparatus to be formed of is three or more electric power converter circuits. It is only necessary to establish an appropriate phase differences between the respective PWM signals which control the electric power converter circuits, in accordance with a PWM duty ratio that is currently set (i.e. a duty ratio that is to be applied by each of the electric power converter circuits), such as to minimize the amplitude of specific high-frequency components in the output current from the apparatus. In the above description, the circuits 14 and 15 are described as respective control circuits. However these are not mutually independent circuits. They can be considered to constitute a single control circuit, requiring only a single PWM control value setting circuit. That is, such a single control circuit determines a phase difference value based on a PWM control value, and thereby produces a plurality of control signals (PWM signals) having respectively identical frequency, identical duty ratio, and mutually different phase.

Hence it will be understood that the invention is not limited to the configuration shown in FIG. 1 for producing the PWM signals that are supplied to control the plurality of electric power converter circuits.

It will further be understood that overall control of the phase difference setting circuit 152 for performing the functions described above can readily be implemented by a usual type of microcomputer, operating in accordance with a stored program. In particular it will be apparent that the functions described for the phase difference setting section 152b can readily be implemented under such control, in conjunction with a phase locked loop (PLL) circuit, and a circuit for delaying the reference signal by a controlled amount (an equal to the required phase difference). In that case, the PLL is configured to be synchronized with the delayed reference signal, and to provide the 100 kHz pulse signal that is supplied to the PWM signal generating circuit 153.

Second Embodiment

A second embodiment of an electric power converter apparatus is described in the following. This embodiment utilizes a data map as for the first embodiment, but differs from the first embodiment in that the phase difference values stored in the data map can be corrected during operation of the apparatus, as described in the following.

Figure 9:
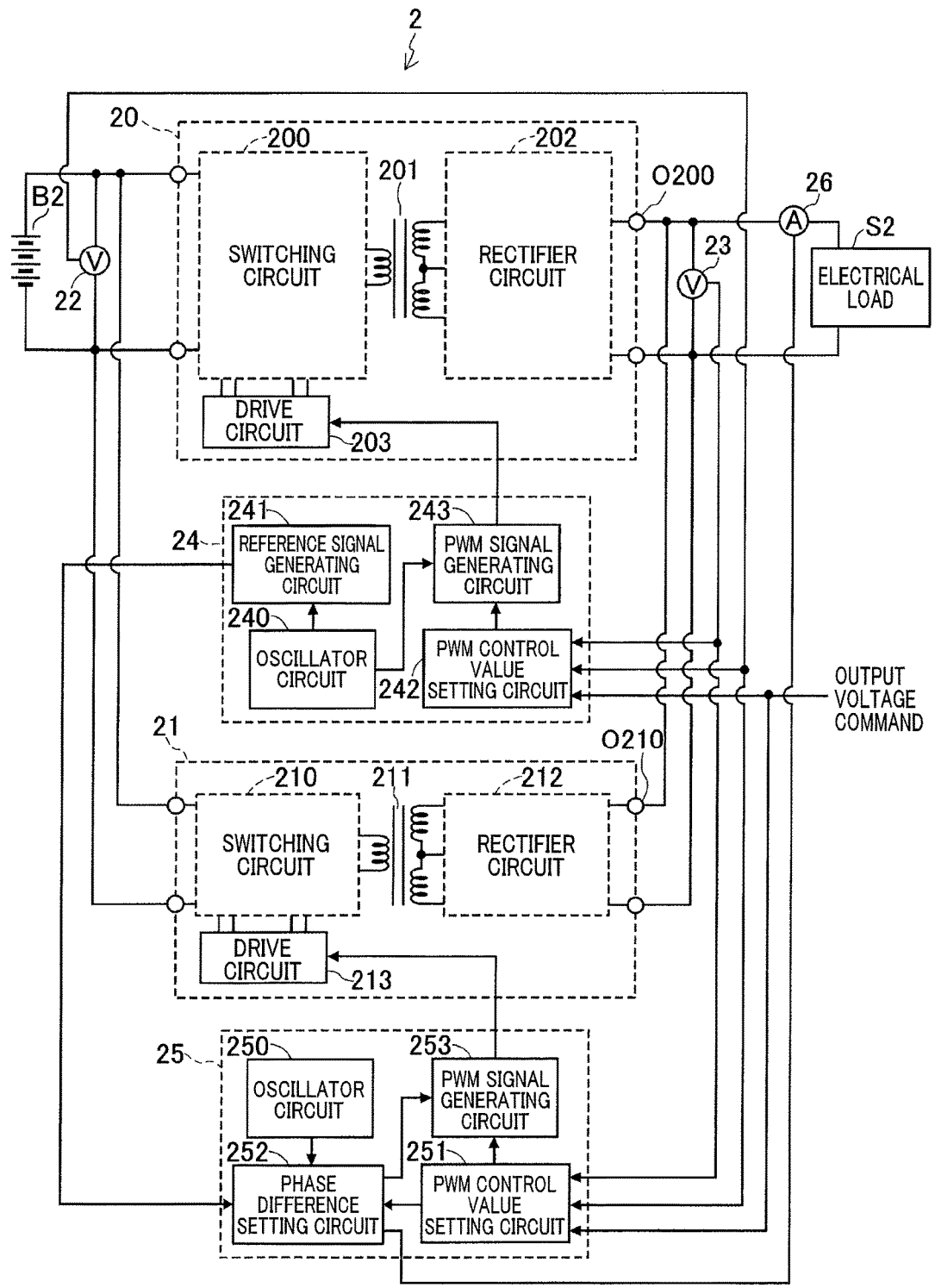
FIG. 9 is a circuit diagram of a second embodiment of an electric power converter apparatus.

The electric power converter apparatus 2 of the second embodiment will be described referring to FIGS. 9 and 10. As shown in FIG. 9, the overall configuration is similar to the electric power converter apparatus 1 of the first embodiment, with DC power from a high-voltage battery B2 of a vehicle being converted to an DC power at a different voltage, and supplied to an electrical load S2 of the vehicle.

Electric power converter circuits 20 and 21 of this embodiment are identical to the circuits 10 and 11 respectively of the first embodiment. The voltage sensors 22 and 23 of the second embodiment are of identical type to the sensors 12 and 13 of the first embodiment, and the switching circuits 200 and 210, transformers 201, 211, drive circuits 203, 213 are respectively identical to the switching circuits 100 and 110, transformers 101, 111, and drive circuits 103, 113 of the first embodiment Essentially, the second embodiment differs from the first embodiment by further incorporating a current sensor 26, and with respect to the configuration and operation of a control circuit 25.

The current sensor 26 is connected between the electrical load S2 and an output terminal O200 of the electric power converter circuit 20, and detects the output current supplied from the electric power converter apparatus 2 to the electrical load S1 (i.e., combined output currents from the electric power converter circuits 10 and 11). A signal expressing the detection results is supplied to the control circuit 25 from the current sensor 26.

An oscillator circuit 250, PWM control value setting circuit 251 and PWM signal generating circuit 253 of the control circuit 25 are respectively identical to the oscillator circuit 150, the PWM control value setting circuit 151 and the PWM signal generating circuit 153 in the control circuit 15 of the first embodiment. Other than with respect to the operation of a phase difference setting circuit 252, described in the following, the functioning of the control circuit 25 is identical to that of the control circuit 15 of the first embodiment. That is, the phase difference setting circuit 252 produces a pulse signal which differs in phase from the output signal of the oscillator circuit 140 by a specific amount, and which is supplied to the PWM signal generating circuit 253. The PWM signal generating circuit 253 generates a PWM signal whose phase and frequency are determined by the pulse signal supplied from the phase difference setting circuit 252, and having a duty ratio that is set by the PWM control value setting circuit 251.

Figure 10:
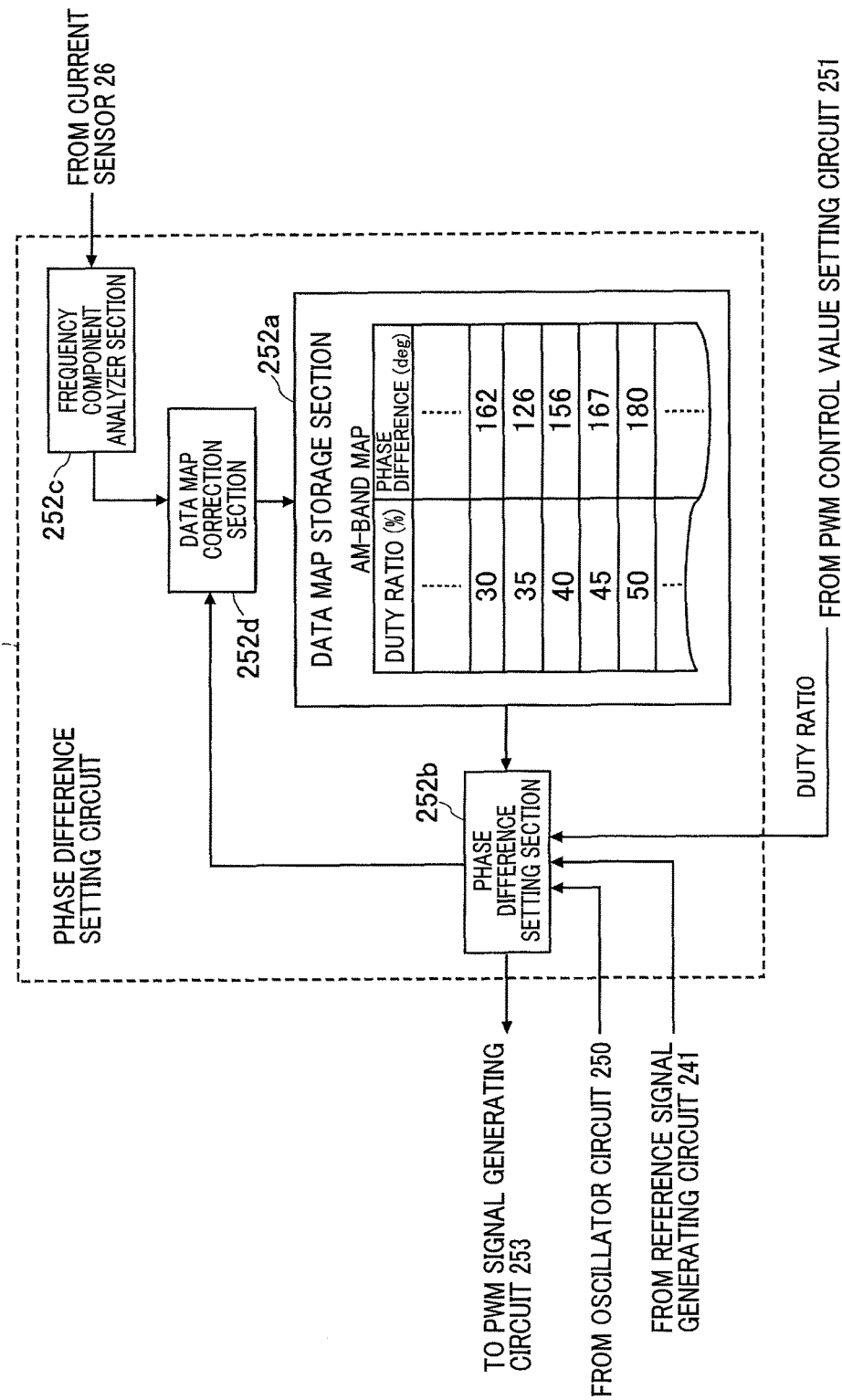
FIG. 10 is a block diagram of a phase difference setting circuit shown in FIG. 9.

As shown in FIG. 10, the phase difference setting circuit 252 is formed of a data map storage section 252a, a phase difference setting section 252b, a frequency component analyzer section 252c, and a data map correction section 252d. The data map storage section 252a is identical to the data map storage section 152a of the first embodiment. However in the case of the phase difference setting circuit 252, the contents of the data map storage section 252a can be corrected (compensated) if necessary, after the electric power converter apparatus 2 has been set in operation. A rewritable type of non-volatile memory device is used to constitute the data map storage section 252a, so that each currently stored phase difference value can be replaced by a corrected value.

The phase difference setting section 252b has a similar function to that of the phase difference setting section 152b of the first embodiment. However in addition, the phase difference setting section 252b supplies the currently set values of PWM signal duty ratio (from the PWM control value setting circuit 251) and PWM signal phase difference (from the data map storage section 252a) to the data map correction section 252d.

The frequency component analyzer section 252c receives the detection results for the output current from the electric power converter apparatus 2, from the current sensor 26, and analyses the frequency components of the ripple current in that output current. The analysis results from the frequency component analyzer section 252c express the maximum frequency component amplitude (defined above in the description of the first embodiment) within the AM radio reception range (500 kHz~1.7 MHz). The currently obtained analysis result (maximum frequency component amplitude) is supplied to the data map correction section 252d.

The data map correction section 252d receives signals from the phase difference setting section 252b expressing the values of PWM signal duty ratio and phase difference that are currently set, and also receives the analysis result (i.e., maximum frequency component amplitude value) that is currently obtained by the frequency component analyzer section 252c.

The operation of the electric power converter apparatus 2 of the second embodiment will be described referring to FIGS. 9 and 10. Other than with respect to a map data correction function, the operation of the phase difference setting section and the data map of this embodiment is identical to that of the first embodiment, so that further description is omitted.

Based on the values of PWM signal duty ratio and PWM signal phase difference supplied from the phase difference setting section 252b and on the analysis result obtained by the frequency component analyzer section 252c, the data map correction section 252d corrects (i.e., updates to an amended value) the corresponding phase difference value that is stored in the data map storage section 252a.

A data map correction operation can be executed as follows. The data map correction section successively varies the set value of phase difference (e.g., within the range 0° to 90° shown in FIG. 4), and detects the optimum phase difference (at which the amplitude of the ripple current frequency components becomes a minimum) based on the output values from the frequency component analyzer section 252c. If the optimum phase difference is found to differ from the phase difference value that is held in the data map storage section 252a in correspondence with the currently set value of duty ratio, then the stored value of phase difference is corrected to the optimum value.

The advantages of the above-described data map correction function of the second embodiment, executed by the data map correction section 252d in conjunction with the frequency component analyzer section 252c, are as follows. The data map contents can be appropriately corrected based on results that are obtained during operation of the electric power converter apparatus 2. The map data can thereby be amended to be accurately in accordance with the actual operating characteristics of the electric power converter apparatus 2. It can thereby be reliably ensured that the amplitude of specific high-frequency (harmonic) components of the ripple current in the output current from the electric power converter apparatus 2 will be effectively reduced.

The invention is not limited to the configuration for the second embodiment described above, and it would be equally possible for the electric power converter apparatus to be formed of three or more electric power converter circuits with a corresponding set of three or more control circuits.

In that case, each of the control circuits includes a PWM signal generating circuit, one of the control circuits includes a circuit for generating a signal used as a phase reference for PWM signal generation, each of the other control circuits includes a phase difference setting circuit and a stored data map which relates values of PWM signal phase difference to corresponding values of PWM duty ratio, and at least one of the control circuits includes a data map correction section.

Third Embodiment

A third embodiment is described in the following. The electric power converter apparatus 3 of this embodiment utilizes a pair of data maps, respectively corresponding to AM-band and FM-band frequency ranges as described in the following, but is otherwise similar to the second embodiment described above.

Figure 11:
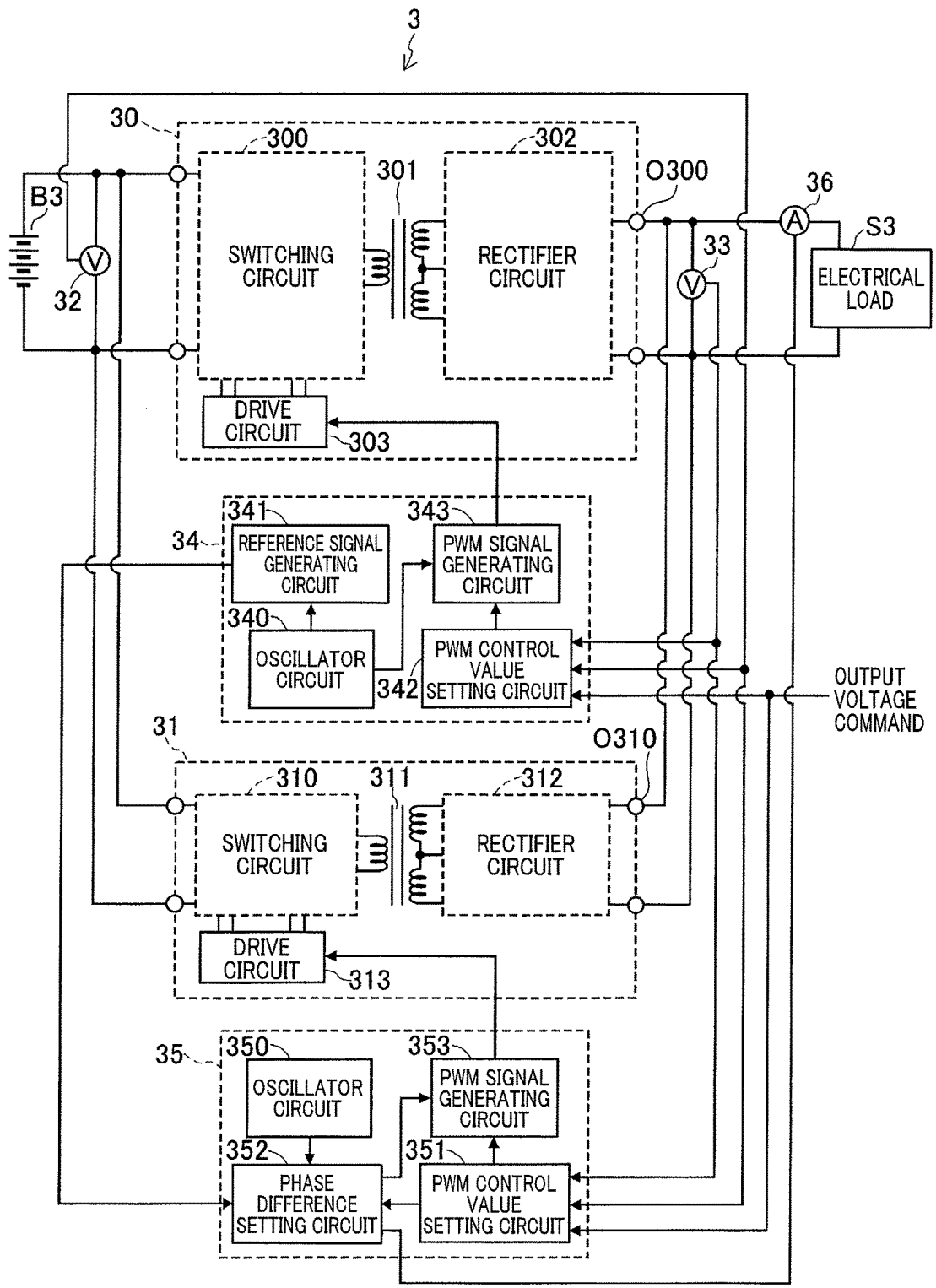
FIG. 11 is a circuit diagram of a third embodiment of an electric power converter apparatus.

The configuration of the third embodiment will first be described referring to FIGS. 11 and 12. Only the features of difference from the second embodiment will be described in detail. As shown in FIG. 11, the electric power converter apparatus 3 of the third embodiment incorporates a control circuit 35, which includes an oscillator circuit 350, a PWM control value setting circuit 351 and a PWM signal generating circuit 353 that are respectively identical to the oscillator circuit 250, the PWM control value setting circuit 251 and the PWM signal generating circuit 253 in the control circuit 25 of the second embodiment. The control circuit 35 further includes a phase difference setting circuit 352, whose function and operation are identical to those of the phase difference setting circuit 252 of the second embodiment, other than with respect to use of the AM-band, FM-band data maps, which are held stored in the phase difference setting circuit 352.

Figure 12:
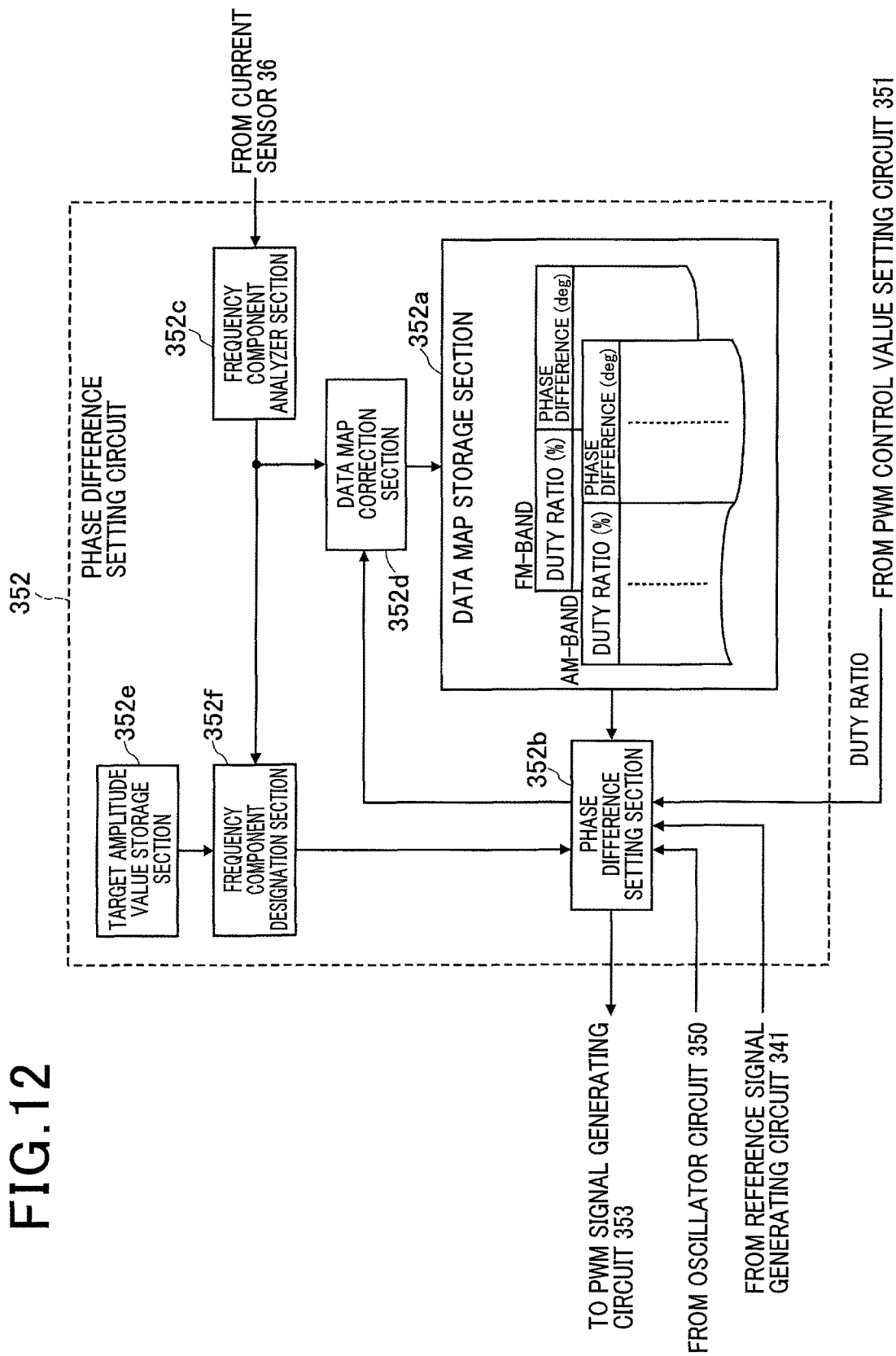
FIG. 12 is a block diagram of a phase difference setting circuit shown in FIG. 11; and, FIG. 13 is a block diagram of a phase difference setting circuit of an alternative form of the third embodiment.

As shown in FIG. 12, the phase difference setting circuit 352 is formed of a data map storage section 352a, a phase difference setting section 352b, a frequency component analyzer section 352c, a data map correction section 352d, a target amplitude value storage section 352e, and a frequency component designation section 352f. The function of the data map correction section 352d is identical to that of the data map correction section 252d of the second embodiment described above. The frequency component analyzer section 352c has a similar function to that of the frequency component analyzer section 252c of the second embodiment, but is required to execute frequency analysis over a range which includes both the AM-band and FM-band radio frequency ranges. The FM-band frequency range of a vehicle-installed radio receiver is generally 76 MHz~90 MHz.

The AM-band data map that is stored in the data map storage section 352a is identical to the AM-band data map in the data map storage section 252a of the second embodiment, i.e., in which each of respective values of PWM signal duty ratio is linked to a corresponding value of phase difference between the PWM signals from the control circuit 34 and control circuit 35 whereby the amplitude of frequency components (ripple current harmonic frequency components) in the output current from the electric power converter apparatus 3, within the AM-band frequency range, is minimized. The FM-band data map that is stored in the data map storage section 352a similarly links each of the duty ratio values to a corresponding stored value of PWM signal phase difference. However in this case, the corresponding value of phase difference is predetermined such as to minimize the amplitude of ripple current frequency components that are within the FM-band frequency range (76 MHz~90 MHz).

The functions of the target amplitude value storage section 352e and frequency component designation section 352f are as follows. The target amplitude value storage section 352e stores a target value of frequency component amplitude. The 352f receives the frequency analysis results obtained by the frequency component analyzer section 352c, i.e., respective amplitude values of frequency components that are within the AM-band and FM-band frequency ranges. The frequency component designation section 352f compares these respective amplitude values with the target value that is held in the target amplitude value storage section 352e. If any of these amplitude values is judged to exceed the target value, the frequency component designation section 352f determines the frequency component (referred to in the following as the designated frequency component) whose amplitude exceeds the target value by the greatest extent. The designated frequency component is identified as being a frequency component whose amplitude is required to be reduced. Specifically, the frequency component designation section 352f inputs a signal to the phase difference setting section 352b indicating the judgement result, i.e., indicating whether the designated frequency component is within the AM-band or within the FM-band frequency range.

In that way, when the duty ratio that is set by the PWM control value setting circuit 351 becomes changed, and it is then determined by the frequency component designation section 352f that one or more of the ripple current frequency components has excessively high amplitude, the appropriate one of the AM-band and FM-band data maps is selected by the phase difference setting section 325b in accordance with the designation result from the frequency component designation section 352f. The value of PWM phase difference corresponding to the newly set value of duty ratio is then read out from the selected data map, and the phase difference between the PWM signals from the control circuits 34 and 35 respectively is set accordingly.

In that way the most suitable one of the AM-band and FM-band data maps is selected, for appropriately reducing the amplitude of the ripple current frequency components.

In other respects, the operation and configuration of the third embodiment are identical to those of the second embodiment described above.

Figure 13:
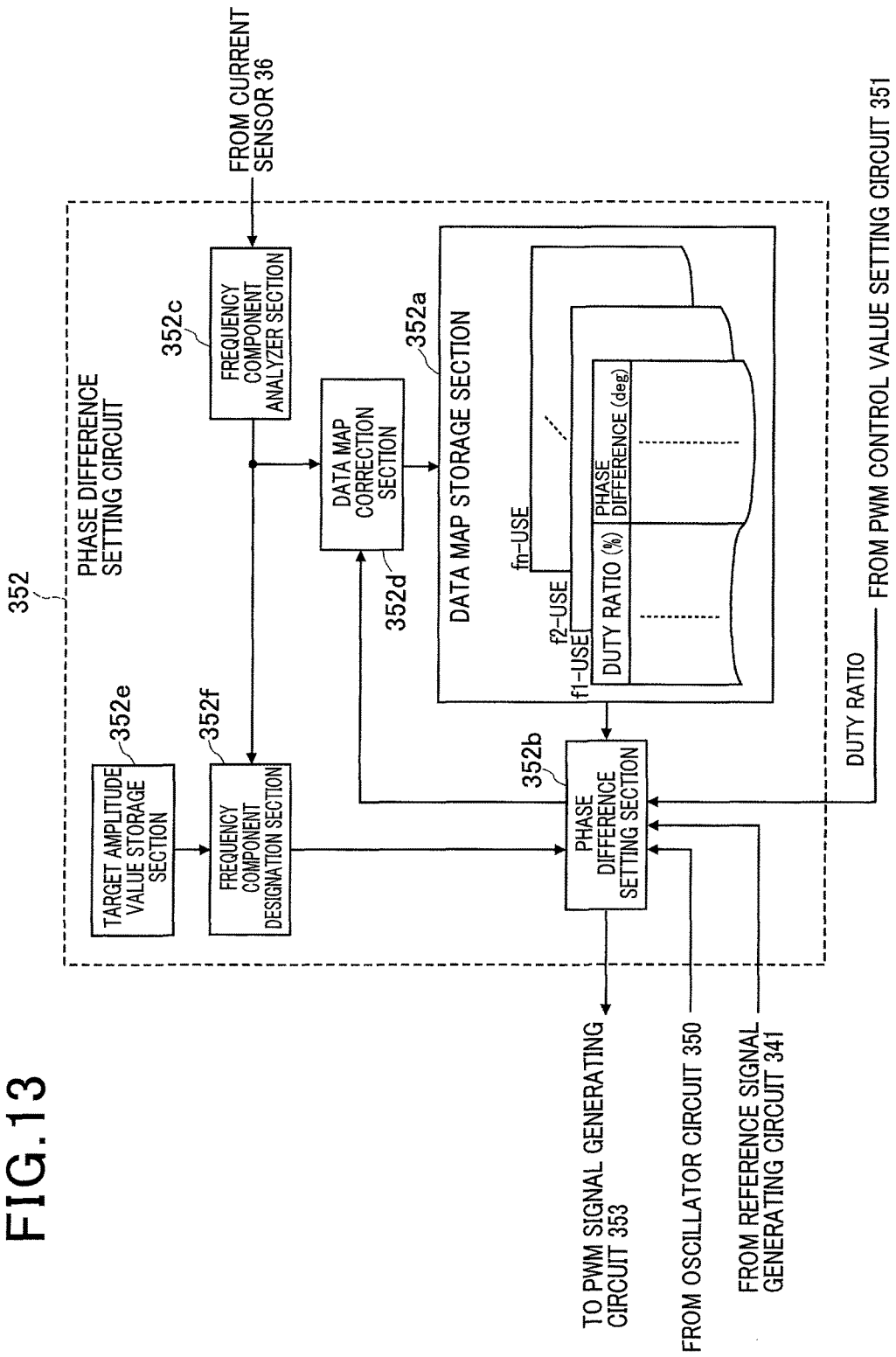

The third embodiment has been described above for the case of utilizing two data maps, respectively corresponding to the AM-band and FM-band of radio frequencies. However it would be equally possible to utilize three or more of such data maps, corresponding to respectively different radio communication frequency ranges. This is illustrated in FIG. 13, in which the data map storage section 352a of the phase difference setting circuit 352 stores a total of n data maps, corresponding to respective frequency ranges f1, f2, ... fn.

The invention has been described above referring to specific embodiments, however the invention is not limited to these, and various alternative forms or modifications of the embodiment or combinations of features from respective embodiments may be envisaged, which fall within the scope of the invention as set out in the appended claims.

What is claimed is:

1. An electric power converter apparatus comprising a plurality of electric power converter circuits having respective pairs of input terminals connected in parallel and respective pairs of output terminals connected in parallel, each of the electric power converter circuits comprising a plurality of switching elements and being controlled by a corresponding PWM (pulse width modulation) control signal for executing switching of the switching elements, for converting input electric power supplied to the input terminals to output electric power which is produced from the output terminals; and control circuitry configured to generate a plurality of PWM signals mutually differing in phase by a specific phase difference, each of the PWM signals having an identical PWM ratio, and to supply the PWM signals as the corresponding PWM control signals to respective ones of the electric power converter circuits, the control circuitry being controllable for selectively setting the PWM duty ratio to obtain an instantly required DC voltage of the output electric power;

wherein the control circuitry is configured to set the specific phase difference at a value based upon an instantly set value of the PWM duty ratio, for minimizing an amplitude of specific ripple current frequency components of a ripple current, the ripple current being present in a combined output current comprising a combination of respective output currents produced from the plurality of electric power converter circuits.

2. The electric power converter apparatus according to claim 1, wherein the control circuitry comprises:

a data map relating each of respective values of the PWM duty ratio to a corresponding value of phase difference, the corresponding value of phase difference being predetermined for minimizing an amplitude of the ripple current frequency components when the corresponding value of PWM duty ratio is set; and a phase difference setting section configured for obtaining, from the data map, a phase difference value corresponding to a value of PWM duty ratio that is currently set, and for setting the obtained phase difference value as the specific phase difference.

3. The electric power converter apparatus according to claim 2, wherein the control circuitry comprises:

a frequency component analyzer section configured to derive analysis results expressing respective amplitude values of the ripple current frequency components; and a data map correction section configured to correct each of respective ones of the phase difference values stored in the data map, based on analysis results derived by the frequency component analyzer section when the PWM duty ratio corresponding to the phase difference value has become set by the control circuitry.

4. The electric power converter apparatus according to claim 1, wherein the control circuitry comprises:

a frequency component analyzer section configured to derive analysis results expressing respective amplitudes of the ripple current frequency components;

a plurality of data maps corresponding to respectively different frequency ranges, each data map relating each of respective values of the PWM duty ratio to a corresponding value of the specific phase difference, the corresponding value being predetermined for reducing a highest amplitude of specific ripple current frequency components to a minimum amplitude value, the specific ripple current frequency components being within the frequency range corresponding to the data map; and a frequency component designation section configured to specify one of the ripple current frequency components as a designated frequency component;

wherein the phase difference setting section is configured to select a data map that corresponds to a frequency range containing the frequency of the designated frequency component, and to obtain the value for the specific phase difference from the selected data map.

5. The electric power converter apparatus according to claim 4, wherein:

the control circuitry comprises a frequency component analyzer section configured to derive analysis results expressing respective amplitude values of the ripple current frequency components; and the frequency component designation section is configured to specify the designated frequency component based upon the analysis results from the frequency component analyzer section.

6. The electric power converter apparatus according to claim 5, wherein:

the control circuitry comprises a target value memory section having stored therein a target value of frequency component amplitude, and the frequency component designation section is configured to specify the designated frequency component as a ripple current frequency component having an amplitude that exceeds the target value of frequency component amplitude by a greater amount than any other of the ripple current frequency components.

7. The electric power converter apparatus according to claim 5, wherein the control circuitry comprises a data map correction section configured to correct each of respective ones of the phase difference values stored in the data map, based on analysis results derived by the frequency component analyzer section while the duty ratio corresponding to the phase difference value is set by the control circuitry.

8. The electric power converter apparatus according to claim 2, wherein the data constituting the data map are derived based upon results of computer simulation.

9. The electric power converter apparatus according to claim 1, wherein the plurality of electric power converter circuits and the control circuitry are respectively installed in a vehicle.

10. The electric power converter apparatus according to claim 1, wherein the control circuitry comprises a plurality of control circuits generating respective ones of the plurality of PWM signals, wherein a frequency of a PWM signal generated by one of the control circuits is utilized as a reference frequency by each of remaining ones of the control circuits in generating remaining ones of the plurality of PWM signals.

* * * * *